INVENTORS
ROLAND C. NUNN
CHARLES E. MORAN
SIDNEY V. SMITH
MATTHEW W. TOBRINER
BY
ATTORNEYS

July 4, 1967
R. C. NUNN ET AL
3,328,891
PREPARING CROPS FOR HARVEST
Filed April 12, 1965
2 Sheets-Sheet 2
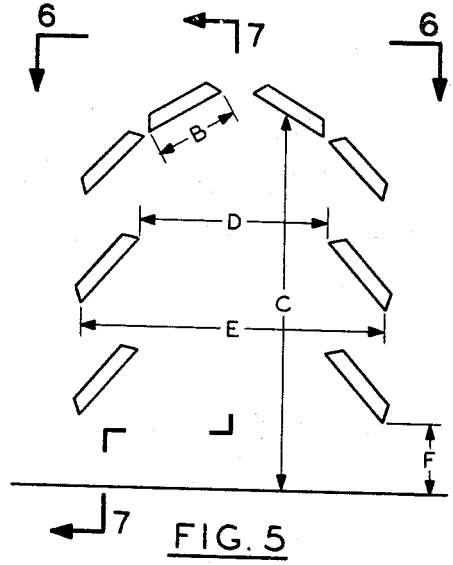
FIG. 5
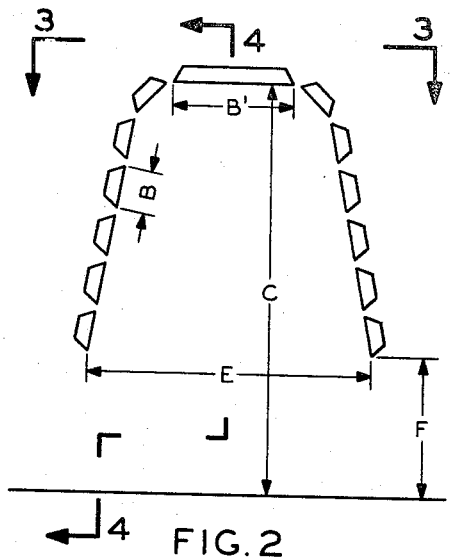
FIG. 2
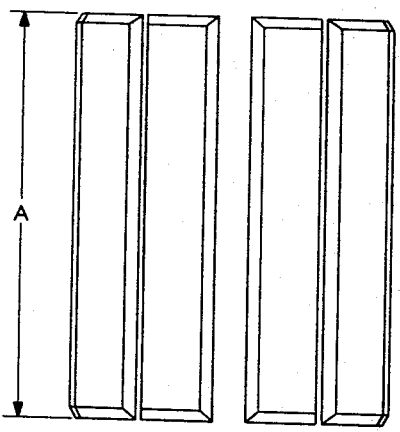
FIG. 6
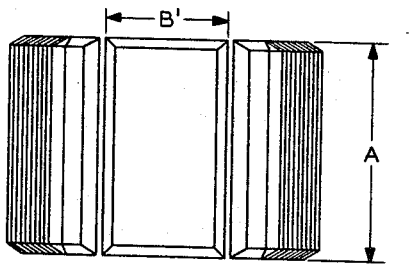
FIG. 3
FIG. 4
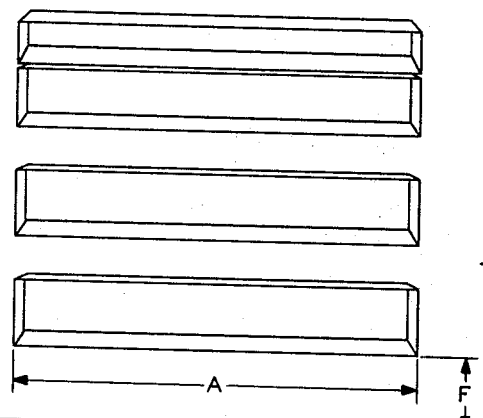
FIG. 7
INVENTORS
ROLAND C. NUNN
CHARLES E. MORAN
SIDNEY V. SMITH
MATTHEW W. TOBRINER
BY P.E. Johnston
Edward J. Keeling
ATTORNEYS United States Patent Office 3,328,891
Patented July 4, 1967

3,328,891
PREPARING CROPS FOR HARVEST
Roland C. Nunn, Orinda, Charles E. Moran, Richmond, and Sidney V. Smith, Yuba City, Calif., and Matthew W. Tobriner, Washington, D.C., assignors to Chevron Research Company, a corporation of Delaware
Filed Apr. 12, 1965, Ser. No. 447,412
9 Claims. (Cl. 34—4)

This invention relates to defoliating or desiccating the the leaves of plants through the application of radiant energy to the plants; and more particularly, this invention relates to defoliating plants, such as cotton, by means of predetermined exposure to infrared radiation.

It has become the practice among crop growers to defoliate certain crops prior to harvesting. This is particularly true in crops which are mechanically harvested. By removing the leaves prior to harvesting, a cleaner and more efficient harvest can be accomplished, particularly in such a crop as cotton. If cotton is mechanically picked while green leaves remain on the plant staining and contamination of the cotton will occur, thus resulting in an inferior grade of cotton.

There are also other advantages to be gained by defoliating plants. For example, defoliating cotton prior to harvesting also assists in boll opening and controlling cotton boll rot. The lower portions of a cotton plant are normally shaded from the sun and protected from the wind by the leaves, and this portion of the plant retains a great deal of moisture. The damp portion of the plant served as an excellent host to the fungus which caused cotton boll rot. With the leaves removed, however, the sun and wind dry the damp portion of the plant and the fungus is controlled.

Heretofore various chemical cotton defoliants have been used. However, these defoliants have not been entirely satisfactory due primarily to the method of application. Since the chemical defoliants are sprayed on the cotton plants, the spraying is subject to wind and moisture conditions. Further, cotton defoliants have a tendency to leave a harmful residue after harvest; and, since it has become the practice for farmers to rotate crops so that more than one crop may be grown on any given acreage in succession, a residue left by the chemical defoliant may harm a later planted crop. Thus there is still need for an effective means for defoliating plants, such as cotton, prior to harvesting.

The present invention involves exposing plants, such as cotton plants, to infrared radiation of a predetermined strength for a critical exposure period in the absence of direct flame contact to provide optimum defoliation of the cotton plants with no resultant loss in cotton fiber quality. Infrared radiation covers the portion of the electromagnetic spectrum which has wave lengths between 1.5 microns and 16 microns. The wave lengths are slightly longer than visible light. Objects having surface temperatures between 700° F. and 2500° F. emit sizable quantities of radiant energy. The quantity of radiation depends on the emissivity and the temperature of the radiator. Radiation travels in straight lines, can be focused like a light beam, and heats the objects that it strikes rather than the air in its path.

In one aspect this invention comprises exposing plants, and particularly cotton plants, to infrared radiation of a predetermined strength and for predetermined time to cause defoliation of the plants. In some instances it may be desirable to desiccate the leaves rather than to remove them from the plant. It has been found that exposure time and source strength as well as distance from the plant are critical to acquiring defoliation. Thus too short an exposure time will result in inadequate leaf wilt and little, if any, leaf drop. On the other hand, exposure times of a longer duration will cause desiccation of the leaves without leaf drop. However, too great an exposure time will damage the cotton fibers. Thus to obtain defoliation or desiccation without damage to the crop, the exposure time of a plant to a proprely sized source must be controlled within limits.

In accordance to the invention, cotton defoliation by infrared radiation requires that the defoliation apparatus be movable through a cotton field at a reasonable rate of speed so that a sizable acreage can be handled at a minimum expense. Thus for practical application of infrared radiation to defoliate commercially grown cotton, it is necessary to form a movable infrared heat source which is capable of directing radiation at the plants. It has been found that a ∩-shaped bank of infrared burners having reflecting surfaces is ideal for this purpose. Several types of infrared burners are currently available. One of the available types of burners suitable for use in the invention is the noncatalytic atmospheric burner which operates at red brightness temperatures of 1400°–1800° F. with essentially no visible flame of the combustion surface. A plurality of burners having reflecting surfaces arranged about them are mounted on a ∩-shaped frame to provide the radiation source. Depending on the size of the plants to be treated, the horizontal width of the radiation source should be between about 15″ and 40″ and the vertical height of the radiation source should be between about 24″ and 60″. This source is mounted on a movable frame for moving through the cotton rows. Thus both sides and the top of the cotton plants along a row can be exposed to infrared radiation.

It has been found that the source strength of the infrared heaters and reflecting surfaces should be of a size to supply the cotton plants with between 0.01 B.t.u./sec./in.$^2$ and about 0.08 B.t.u./sec./in.$^2$ of radiation. A source strength within this range sized as noted above and moved along a row of cotton plants so that each plant gets between 1.0 seconds to 8.0 seconds of exposure will give sufficient heat to cause leaf wilting and leaf dropping without causing singeing of the cotton or other adverse effects. The highly preferred range is 0.02 to 0.04 B.t.u./sec./in.$^2$ of radiation for periods of from 1.0 to 3.0 seconds.

Further objects and advantages of the present invention will become apparent from the following detailed description read in view of the accompanying drawings which are made a part of this specification and in which:

FIGURES 2–4 show one alignment of radiating reflectors; and

FIGURES 5–7 show another alignment of radiating reflectors.

Figure 1:
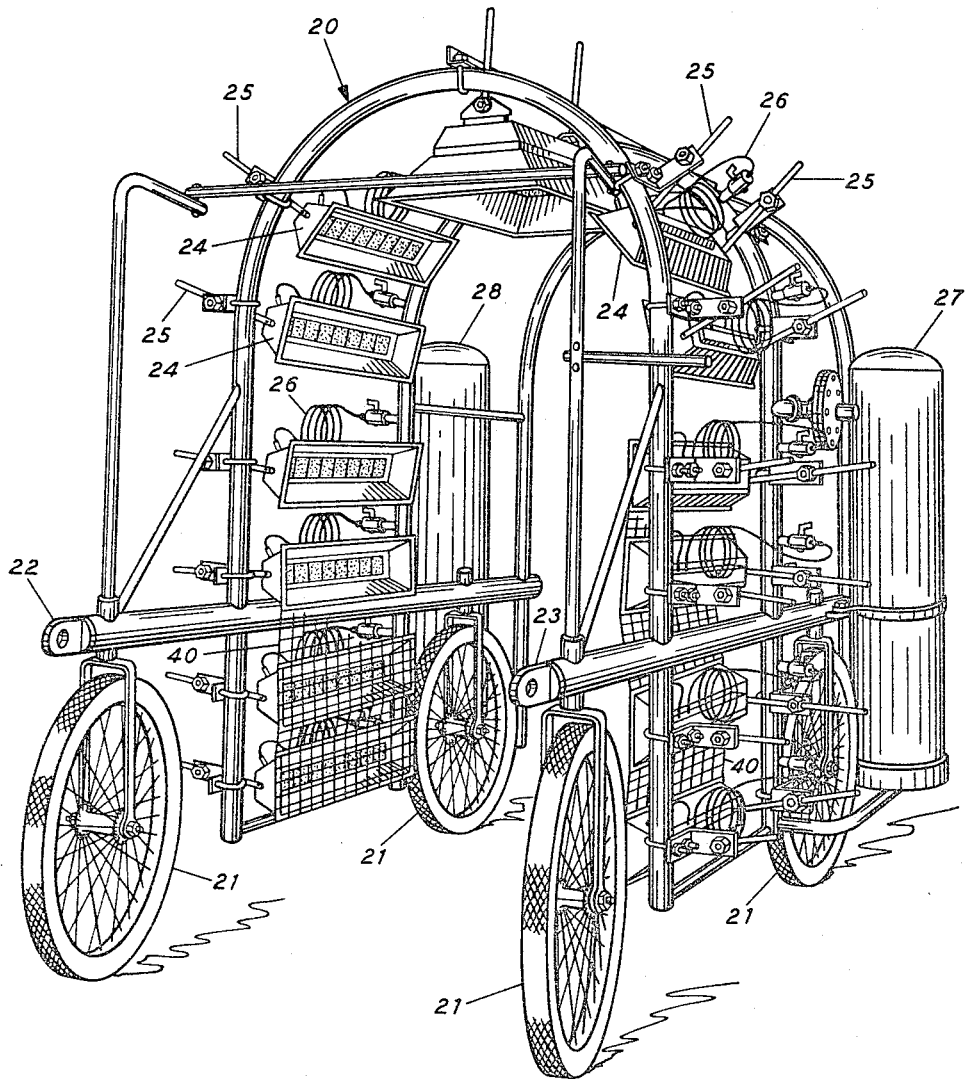
FIGURE 1 shows a preferred form of apparatus for use in defoliating or disiccating cotton by means of infrared radiation.

With reference now to FIGURE 1, a suitable form of apparatus for use in exposing cotton plants to infrared radiation is shown. A substantially ∩-shaped frame, indicated generally by the numeral 20, is provided with wheels 21 and suitable drawbar means 22 and 23 for moving the frame over a row of cotton. Infrared propane burners 24 having suitable reflecting surfaces are movably spaced apart on the frame 20 to provide infrared radiation around the row of cotton plants. The infrared burners are slidably adjustable on the frame 20 so that they may be raised or lowered thereon. The burners 24 are connected to push rods 25, which rods are both extendably and pivotally mounted with respect to the frame so that the burners may be moved in and out from the frame and also pivoted with respect to the frame. The burners are adjustable so that, depending on the size of a particular stand of cotton, they may be adjusted to pass around the plants at a distance of from about 3 to 8 inches. Preferably the burners are adjusted to pass about 4 to 6 inches from the plant. Propane from sources 27 and 28 is supplied to the center ∩-member through pressure regulators. The center ∩-member is hollow and blanked off at each end. Suitable tubing 26 leads the propane from the center ∩-member to the various burners. Manual shut-offs are supplied for each burner.

The preferred means for supplying infrared radiation in accordance with the invention are radiant gas burners. Preferred burners of this type are the noncatalytic atmospheric burners which operate at temperatures in the 1400° F.–1800° F. range with essentially no visible flame. Burners of this type are equipped with either ceramic or metallic combustion surfaces which can be formed in a variety of shapes. Combustion of the gas and air mixture takes place at or near the surface of the radiant energy emitter heating it to a desired temperature. The burners may be enclosed by a rectangular reflecting surface. Burners of a suitable type are described and discussed in American Gas Association Research Bulletins 83, May 1960, and 92, November 1962.

The burners 24 positioned in suitable reflectors are adjustably mounted on the frame to provide a substantially ∩-shaped bank of infrared radiation means which can be closely positioned over the cotton plants and then moved along the row with the plants passing inside the source. The plants should be closely spaced from the radiation bank. A screen shown partially in FIGURE 1 and indicated by the numeral 40 is preferably placed over the burner reflectors to prevent portions of the plants from actually touching the flame portion of the burners. The screen should be placed about 3 to 8 inches from the burner tubes, and the plants should contact and be agitated by the screen. The horizontal and vertical dimensions of the ∩-shaped bank will vary depending on the size of the plants to be treated. However, a horizontal dimension between 15 to 40 inches and a vertical dimension of between 24 to 60 inches will accommodate most normal cotton plants. The burners are adjusted so as to pass over the majority of the leaf-bearing portion of the plants at a distance of from about 3 to 8 inches and preferably about 4 to 6 inches from the leaves of the plants. This can best be accomplished by placing the screen at the desired distance from the burners, say for example 4 inches, and then adjusting the ∩-shaped bank to a size so that the cotton plants are squeezed by the screened bank of burners. Thus the majority of the leaf-bearing portion of the plant is placed close to the burner surface while the screen prevents the plants from actually touching the burner tube.

Both radiation intensity and burner length affect the speed with which the frame may be moved through the field. One way of rating the capacity of a given ∩-shaped heat source is to refer to the total thermal input of the ∩-shaped bank of burners. This is the number of burners multiplied by their B.t.u. per hour input. The effective radiation of the burner can then be figured by using a 55–65% conversion of the thermal input to radiant energy. The combustion fuel is generally LPG and combustion takes place entirely within the burner tube heating it to about 1500°–1700° F. Both the length of the bank of burners and the intensity have nearly additive effects on optimum equipment speed. For example, doubling the burner length and doubling the intensity per foot of the ∩-shaped bank increases the optimum equipment speed fourfold. However, as intensity per foot continues to increase, the higher surface temperatures in the burners produce a shift in energy distribution toward shorter wave lengths which are less efficiently absorbed by the plant. Radiation intensity also varies inversely as the square of the distance from the radiating source. Therefore, there is an upper effective radiation intensity useful in accordance with the present invention so that the inner leaves, as well as the outer leaves, may receive proper amounts of radiation and so that the radiation intensity does not produce excessive fiber damage on the exterior bolls. This upper limit is about 0.14 B.t.u./sec./in.$^2$ of radiation.

The relationship between effective speed, radiation intensity and burner length for typical apparatus is shown below in Table I. The burners are arranged in a ∩-shaped bank as illustrated, for example, in FIGURES 2–4 and FIGURES 5–7. As is evident, lower exposure time is possible with the burner of higher radiation intensity.

TABLE I.—RELATIONSHIP OF EFFECTIVE SPEED, RADIATION INTENSITY, AND BURNER LENGTH

| Characteristics of Burners | | Range for Good Defoliation | |
|---|---|---|---|
| Length, Ft. | Input Capacity, B.t.u./Hr. | Exposure Time, Sec. | Equipment Speed, m.p.h. |
| 2 | 180,000 | [1] 5–7 | 0.27–0.20 |
| 4 | 600,000 | [2] 3–4 | 0.90–0.67 |
| 4 | 720,000 | [2] 2.5–3.5 | 1.1–0.8 |
| 4 | 960,000 | [2] 2.0–3.0 | 1.4–0.9 |

[1] Based on test work with no agitation.
[2] Based on test work with mechanical agitation and side reflectors perpendicular to ground.

Another way to define the source strength of the infrared heaters is to define the limits in terms of radiant energy falling on the plant for a given length of time. Thus it has been found that a burner or burners enclosed by a suitable reflecting surface and having a source output strength of between .01 to .08 B.t.u./sec./in.$^2$ of reflecting surface is effective for defoliating. A source strength within this range will give sufficient heat to cause leaf wilting and leaf dropping without causing singeing of the cotton or other adverse effects when the plants are exposed for a predetermined time. A heat source formed between these limits and moved along the cotton plants at a speed so that each plant is subjected to infrared radiation for a period of time between about 1.0 second to 8.0 seconds will give adequate defoliation. The best overall results are obtained using a source adequate to provide between .02 to .04 B.t.u./sec./in.$^2$ of reflecting surface when exposure times of the plants are between about 1–3 seconds.

As noted above, exposure time of the plants to infrared radiation is determinative as to whether defoliation or desiccation will occur and also whether or not damage will be done to the cotton fibers. Set out below are Tables II, III, IV, and V showing the relationship between exposure times and leaf drop (defoliation) and leaf destruction without drop (desiccation) with regard to cotton damage.

The results set out in Table II show the condition of the plants 14 days after exposure to infrared radiation. The burners were arranged in a ∩-shaped bank and the reflecting surfaces were adjusted as shown in FIGURES 2–4. The length of the reflecting surface (dimension A) was 25″. The width of each side reflector (dimension B) was 5″, and the width of the top reflector (dimension B¹) was 15″. Thus the total reflector area was 1875 in.$^2$. The total thermal input was 180,000 B.t.u./hr. The radiant energy output, figuring 60% conversion efficiency, was 108,000 B.t.u./hr. or 29.7 B.t.u./sec. This is equivalent to 0.0158 B.t.u./sec./in.$^2$. The dimensions of FIGURES 2–4 are A=25″, B=5″, B¹=15″, C=48″, E=34″, and F=17″.

TABLE II.—EFFECT OF EXXPOSURE TIME ON DEFOLIATION

| Row No. | Plant Exposure Infrared Heaters, Avg. Sec. | Cotton Singeing | Plant Condition 14 Days After Infrared Exposure | | Remarks |
|---|---|---|---|---|---|
| | | | Leaf Wilt Demerit [1] | Leaf Drop | |
| 20 | 0 | Nil | 1 | Very Light | |
| 18 | 2.3 | ----do---- | 2 | ----do---- | |
| 10½ | 3.8 | ----do---- | 5 | Light Mod | |
| 11 | 5.9 | ----do---- | 7 | Moderate | Good Defoliation. |
| 11½ | 7.8 | Light | 6 | Mod., Heavy | Do. |
| 12 | 12.5 | Moderate | 8½ | Very Light | Good Desiccation. |
| 12½ | 19.9 | Heavy | 8½ | ----do---- | |

[1] 0=0% wilt, 10=100% wilt.

TABLE III.—EFFECT OF EXPOSURE TIME ON COTTON QUALITY [1] OF COTTON OF TABLE II

| Row No. | Average Plant Exposure, Sec. | Fibrograph (Span Length) | | | "0" Gage Strength, 1/1,000 p.s.i. | Fiber Fineness Micronaire Index [5] |
|---|---|---|---|---|---|---|
| | | 50%,[2] Inches | 2.5%,[3] Inches | Uniformity Index, percent [4] | | |
| 20 | 0 | 0.433 | 1.011 | 42.8 | 67.4 | 4.3 |
| 18 | 2.3 | 0.388 | 0.981 | 29.6 | 72.3 | 3.9 |
| 10½ | 3.8 | 0.400 | 1.000 | 40.0 | 78.8 | 4.5 |
| 11 | 5.9 | 0.438 | 1.013 | 43.2 | 74.5 | 4.6 |
| 11½ | 7.8 | 0.420 | [6] 1.052 | 39.9 | 71.2 | 4.9 |
| 12 | 12.5 | 0.442 | [6] 1.046 | 42.3 | 89.6 | 4.8 |

[1] Tests conducted at Fresno State College.
[2] Upper half mean length (avg. length of all fibers longer than mean length).
[3] Average length of longest 2.5% of all fibers.
[4] Ratio of 50%/2.5%.
[5] The larger the number the coarser the fiber.
[6] Average length for the Clovis Area.

The results set forth in Table IV show plants 16 days after exposure to radiation. The burners were arranged in a ⋂-shaped bank and were adjusted as shown in FIGURES 5–7. The length of the reflecting surface (dimension A) was 48″, and the width of each of the right reflecting surfaces (dimension B) was 10″. The effective surface area then was 80 x 48 or 3840 square inches. The total thermal input for the eight burners was about 960,000 B.t.u./hr. Thus the radiant energy output, utilizing a 60% conversion factor, was about 576,000 B.t.u./hr. or 160 B.t.u./sec. The output per square inch of reflecting surface was about .0415 B.t.u./sec./in.². The dimensions of FIGURES 5–7 are A=48″, B=10″, C=44″, D=23″, E=35″, and F=8″.

TABLE IV.—EFFECT OF EXPOSURE TIME ON DEFOLIATION

| Row No. | Plant Exposure, Avg., Secs. | Cotton Singeing | To Infrared Radiation | | Remarks |
|---|---|---|---|---|---|
| | | | Percent Leaf Wilt | Percent Leaf Drop | |
| 145 | 0 | Nil | 0 | 0 | Control. |
| 156 | 1.2 | Trace | 90 | 90 | Good Defoliation. |
| 155 | 1.4 | Very Light | 95 | 90 | Do. |
| 153 | 1.7 | ---do--- | 90 | 70 | Fair Desiccation. |
| 152 | 2.0 | Light | 95 | 20 | Good Desiccation. |
| 151 | 2.9 | Moderate | 95 | 10 | Do. |

Thus as is evident from Table IV, a desired range of exposure to obtain defoliation with the apparatus and burners described is from about 1.0 to 1.5 seconds. If desiccation is desired, the preferred exposure time is between 2.0 to 3.0 seconds.

Table V shows the effect of the exposure of the plants to radiation of Table IV in relation to quality of the produced cotton. As is evident, the exposure did not cause harm to the cottom.

TABLE V.—EFFECT OF EXPOSURE TIME ON FIBER QUALITY [1] OF COTTON IN TABLE II [2]

| Row No. | Plant Exposure, Avg., Secs. | Uniformity Ratio Percent [3] | Fiber Fineness Micronaire Index | Stelometer Strength, Lbs./In. [2] |
|---|---|---|---|---|
| 145 | 0 | 84 | 4.35 | 2.42 |
| 156 | 1.2 | 84 | 4.09 | 2.38 |
| 155 | 1.4 | 85 | 4.46 | 2.46 |
| 153 | 1.7 | 84 | 4.11 | 2.44 |
| 152 | 2.0 | 86 | 4.03 | 2.35 |
| 151 | 2.9 | 85 | 4.18 | 2.35 |

[1] Test conducted at USDA Cotton Research Station, Shafter, Calif.
[2] .04 B.t.u./Sec./In. diat² raion.
[3] Ratio of average length of all fibers (longer than ¼ inch) divided by average length of all fibers longer than the mean length, above 80, fibers uniform.

In addition to the variables discussed above, it has been found that the effect of the burners on the plants can be increased by adjusting the deflecting surfaces to a position approximately paralleling the surfaces of the leaves. This is usually in a position so that the front of the deflector makes about a 45° angle with the ground. This is clearly shown in FIGURE 5. In comparison, note the perpendicular position of the reflectors with respect to the ground as shown in FIGURE 1. The importance of having the reflector set at about a 45° angle is shown in Table VI below. The advantages can be seen throughout all ranges of leaf wilting. This results from the fact that most leaves on the sides of the plants stand at about a 45° angle to the ground. Tilting of the burners more nearly parallel to the leaf surface results in an increase in the amount of radiating surface "visible" to the leaf.

TABLE VI.—SIDE REFLECTOR ANGLE IS IMPORTANT IN REDUCING EFFECTIVE EXPOSURE TIME

| Plant Exposure, Sec.[3] | Tractor Speed, m.p.h. | Side Reflector Angle,[2] Degrees | Plant Condition After 16 Days[1] | |
|---|---|---|---|---|
| | | | Percent Leaf Wilt | Percent Leaf Drop |
| 1.8[4] | 1.5 | 90 | 15 | 0 |
| 1.8[4] | 1.5 | 45 | 30 | 0 |
| 2.1[5] | 1.3 | 90 | 85 | 40[6] |
| 2.0[5] | 1.4 | 45 | 95 | 20[6] |
| 1.5[5] | 1.8 | 90 | 60 | 20 |
| 1.4[5] | 1.9 | 45 | 90 | 80 |

[1] After exposure.
[2] To ground.
[3] Mechanical agitation.
[4] Six burners, 720,000 B.t.u./hr. input.
[5] Eight burners, 960,000 B.t.u./hr. input.
[6] This reversal probably resulted from desiccation.

In addition to adjusting the reflector as discussed above, improved results can also be obtained by agitation of the plants during the exposure to radiation. Since radiant energy travels in straight lines, shielding of the inner leaves of the plant from the radiator can sometimes result in incomplete wilting of the inner leaves. Both air and mechanical means of agitating the plants have been studied. These results are shown in Table VII. Mechanical agitation, using automobile curb guards mounted around the front side of a ∩-shaped bank increased effectiveness compared to no agitation at equal equipment speed. The placing of a screen over the burners as illustrated in FIGURE 1 also serves to agitate the plants in an effective manner. The screen was placed across the burners' reflectors in such a manner so that the plants were squeezed between the ∩-shaped hood and held about four inches away from the burner tubes. The screen not only provided sufficient plant agitation but it also prevented the exterior bolls from contacting the burner tubes. Air agitation produced by a fan set at an angle to blow air down and through the ∩-shaped bank reduced effectiveness compared with no agitation. This probably resulted from cooling of the radiator because of the increased air velocity across its surface.

TABLE VII.—SOME KINDS OF PLANT AGITATION HELP IN OBTAINING GOOD PLANT COVERAGE

| Plant Exposure, Sec. | Tractor Speed, m.p.h. | Plant Agitation | Plant Condition After 13 Days[1] | |
|---|---|---|---|---|
| | | | Percent Leaf Wilt | Percent Leaf Drop |
| 4.1[2] | 0.6 | Mechanical[3] | 80 | 20 |
| 3.8[2] | 0.7 | None | 60 | 15 |
| 3.8[2] | 0.7 | Air[4] | 50 | 15 |
| 2.9[5] | 1.0 | Mechanical[3] | 95 | 30 |
| 2.8[5] | 1.0 | None | 60 | 10 |
| 2.5[5] | 1.1 | Air[5] | 15 | 0 |

[1] After exposure.
[2] 5 burners, 600,000 B.t.u./hr. input.
[3] 8 automotive curb guards.
[4] 20-inch diameter fan.
[5] 6 burners, 720,000 B.t.u./hr. input.

Additional demonstrations were conducted to show the utility of the invention. A first demonstration was conducted at the USDA Cotton Research Station at Shafter, Calif. The variables investigated at the demonstration conducted at the USDA station are set out below in Table VIII. Two series of runs were made during the demonstration. The first run was conducted about two weeks after the last irrigation period. Plant moisture was relatively high and bolls were about 40% opened. The second run was conducted about 4½ weeks after the last irrigation and therefore plant moisture was relatively low and bolls were about 80% opened. A total of six burner configurations were tried, and the number of burners varied from 5 to 6 to 8. The arrangements were all generally similar to the arrangements illustrated in FIGURES 2–7. The results indicate that increasing the B.t.u./hr. output by increasing the number of burners reduced the exposure by a proportional amount. Effective results were obtained at a 0.5 m.p.h. rate with 600,000 B.t.u./hr. input, 0.9–1.2 m.p.h. at 720,000 B.t.u./hr. input, and up to 2.4 m.p.h. at 960,000 B.t.u./hr. input. Changing the side reflector angle from perpendicular to the ground to a 45° angle reduced exposure times for effective defoliation by up to 50%. Mechanical agitation improved results slightly (about 15%) over no agitation while air agitation had an adverse effect. High plant moisture was conducive to desiccation rather than defoliation. The same is also true with respect to long exposure time. Low plant moisture and high maturity present more of a problem with cotton singeing and boll fires.

TABLE VIII.—INFRARED COTTON DEFOLIATION—USDA COTTON RESEARCH STATION, SHAFTER, CALIF.—VARIABLES INVESTIGATED

I. Plant exposure
   A. Time—1 to 4 seconds
   B. Equipment speeds—0.5 to 2.7 m.p.h.
II. Radiation intensity
   A. Burner pressure
      (1) 20 and 30 p.s.i.g.
      (2) 25% B.t.u. change
   B. Number of burners
      (1) 5 to 8
      (2) 600,000 to 960,000 B.t.u./hr. input
   C. Reflector angle
      (1) Side reflectors vertical to ground
      (2) Side reflectors at 45° angle to ground
   D. Burner length
      (1) 2 and 4 feet
III. Plant agitation
   A. None
   B. Mechanical
   C. Air
IV. Plant moisture
   A. High
   B. Low
V. Plant habit
   A. Height—3 to 5 feet
   B. Foliage—Light to rank
   C. Stand—Upright to lodged Another demonstration was conducted on the Gragnani Farm, in Tranquility, Calif. The demonstration compared the results of infrared defoliation with the chemical defoliation heretofore used in the area. Again, the reflecting surfaces of the burners were arranged generally as shown in FIGURES 2–7. The results of the demonstration are set out below in Table IX.

TABLE IX.—INFRARED COTTON DEFOLIATION TESTS GRAGNANI FARM, TRANQUILITY, CALIF.

I. Infrared plot
   A. Area—1 acre
   B. Burners
      (1) 8 Aeroil HEPR8DW
      (2) Side reflectors at 45° angle to ground
      (3) 975,000 B.t.u./hr./row input
      (4) Inner screen mounted 4 inches away from burner tube
   C. Equipment speed
      (1) Normal growth—1.8 m.p.h.
      (2) Rank growth—1.4 m.p.h.
   D. LPG consumption—14.2–18.5 gallons/acre

TABLE IX.—Continued

II. Chemical plot
  A. Area—16 acres
  B. Application
    (1) Air
    (2) Magnesium chlorate—1.53 gallons/acre III. Defoliation results
  A. Infrared after 15 days
    (1) Normal growth—80% leaf wilt, 75% defoliation
    (2) Rank growth—20% leaf wilt, 15% dedefoliation
  B. Chemical after 17 days
    (1) Normal growth—70% leaf wilt, 60% defoliation
    (2) Rank growth—20% leaf wilt, 15% defoliation IV. Picking and ginning results
  A. Turnout—Equal in both plots (34%)
  B. Grade—Equal in both plots (middling 1⅛)
  C. Yield—Equal in both plots (2⁻ bales/acre)

As is evident from the above, this invention broadly concerns preparing crops for harvest by subjecting the crops to infrared radiation in the absence of flame. Although only a few specific embodiments of the present invention have been described in detail, the scope of the invention is not to be limited to only those embodiments specifically disclosed but rather only by the scope of the appended claims. What is claimed is:

1. A method for preparing a plant for harvesting comprising subjecting the leaves of a plant to a predetermined dose of infrared radiation sufficient to kill the leaves of said plant, said radiation being applied to said plant without contacting the leaves of said plant with flame and where the source strength of the infrared radiation does not exceed .14 B.t.u./sec./in.$^2$.

2. A method of preparing plants for harvesting comprising exposing the leaves of plants to electromagnetic radiation of a predetermined intensity and having a wave length between 1.5 microns and 16 microns for between about 1.0 to 8.0 seconds to kill the leaves of said plants.

3. A method of defoliating or desiccating plant leaves without damaging the crop comprising exposing the leaves of a plant to a source of infrared radiation having an intensity of between 0.01 B.t.u./sec./in.$^2$ and about 0.08 B.t.u./sec./in.$^2$ for a period of time between 1.0 second and 8.0 seconds, said source being spaced from 3 to 8 inches from the leaves of said plant.

4. The method of claim 4 where the plant is cotton.

5. A method of preparing a cotton plant for harvest comprising exposing the leaves of a cotton plant to a source of radiation having a strength of between about 0.02 to 0.04 B.t.u./sec./in.$^2$ of radiation for a period from about 1.0 to 3.0 seconds, said source being spaced from about 3 to 8 inches from the leaves of said plant.

6. A method of defoliating a cotton plant comprising exposing the leaves of a cotton plant to a source of infrared radiation having a strength of between about 0.02 and 0.04 B.t.u./sec./in.$^2$ of radiation for a period of time between 1.0 to 1.7 seconds, said source being spaced from about 3 to 8 inches from the leaves of said plant.

7. A method of desiccating the leaves of a cotton plant comprising exposing the leaves of a cotton plant to a source of infrared radiation having a strength of between about 0.02 and 0.04 B.t.u./sec./in.$^2$ for a period of time between 1.7 to 3.0 seconds, said source being spaced from about 3 to 8 inches from the leaves of said plant.

8. A method of defoliating or desiccating the leaves of cotton plants comprising forming a ∩-shaped infrared source, said ∩-shaped infrared source being arranged so that a substantial portion of the leaves of the plants pass within from 3 to 8 inches from the infrared source, said infrared source having a strength of between about 0.01 B.t.u./sec./in.$^2$ and about 0.08 B.t.u./sec./in.$^2$ of radiation and moving said ∩-shaped infrared source along a row of cotton plants so that the leaves of each plant get between 1.0 second to 8.0 seconds of exposure to said infrared source to kill the leaves of said plants without substantially damaging the cotton of said plants.

9. The method of claim 8 further characterized by the step of agitating the leaves of the plants while exposing them to infrared radiation.

References Cited
UNITED STATES PATENTS

| | | | |
|---|---|---|---|
| 1,419,900 | 6/1922 | Franks | 47—1.44 |
| 2,405,631 | 7/1946 | Attwood | 219—411 X |
| 2,682,728 | 7/1954 | Nisbet et al. | 126—271.2 X |
| 2,882,889 | 4/1959 | Shiplet | 126—271.2 |
| 3,228,668 | 1/1966 | Wright | 34—4 X |

OTHER REFERENCES

"Conserve for Victory With Near Infrared" (pp. 10 and 11); received in Patent Office June 1948.

FREDERICK L. MATTESON, JR., *Primary Examiner.*

D. A. TAMBURRO, *Assistant Examiner.*

UNITED STATES PATENT OFFICE
CERTIFICATE OF CORRECTION

Patent No. 3,328,891                                             July 4, 1967

Roland C. Nunn et al.

It is hereby certified that error appears in the above numbered patent requiring correction and that the said Letters Patent should read as corrected below.

Column 2, line 9, for "proprely" read -- properly --; line 25, for "of" read -- on --; line 52, for "disiccating" read -- desiccating --; column 5, TABLE II, in the heading, line 1 thereof, for "EXXPOSURE" read -- EXPOSURE --; same TABLE II, heading to the second column, for "Plant Exposure Infrared Heaters Avg., Sec." read -- Plant Exposure to Infrared Heaters Avg., Sec. --; TABLE III, fifth column, line 2 thereof, for "29.6" read -- 39.6 --; same column 5, same TABLE III, seventh column, line 2 thereof, for "3.9" read -- 4.9 --; column 6, TABLE V, heading to the fifth column, for "In.$^2$" read -- In.$^3$ --; same TABLE V, footnote 2, for "In. diat$^2$raion" read -- In$^2$ radiation --; column 6, line 69, for "deflecting" read -- reflecting --; line 72, for "deflector" read -- reflector --; column 7, TABLE VII, third column, line 6 thereof, for "Air$^5$" read -- Air$^4$ --; column 9, line 50, for the claim reference numeral "4" read -- 3 --.

Signed and sealed this 25th day of June 1968.

(SEAL)
Attest:

EDWARD M. FLETCHER, JR.                          EDWARD J. BRENNER
Attesting Officer                                    Commissioner of Patents